May 12, 1964 N. E. ANDERSON 3,133,187
TOUCH STARTING OF POWER ARCS
Filed Feb. 27, 1962 2 Sheets-Sheet 1

INVENTOR.
NELSON E. ANDERSON
BY
Leslie C. Byer
ATTORNEY

May 12, 1964  N. E. ANDERSON  3,133,187
TOUCH STARTING OF POWER ARCS
Filed Feb. 27, 1962  2 Sheets-Sheet 2
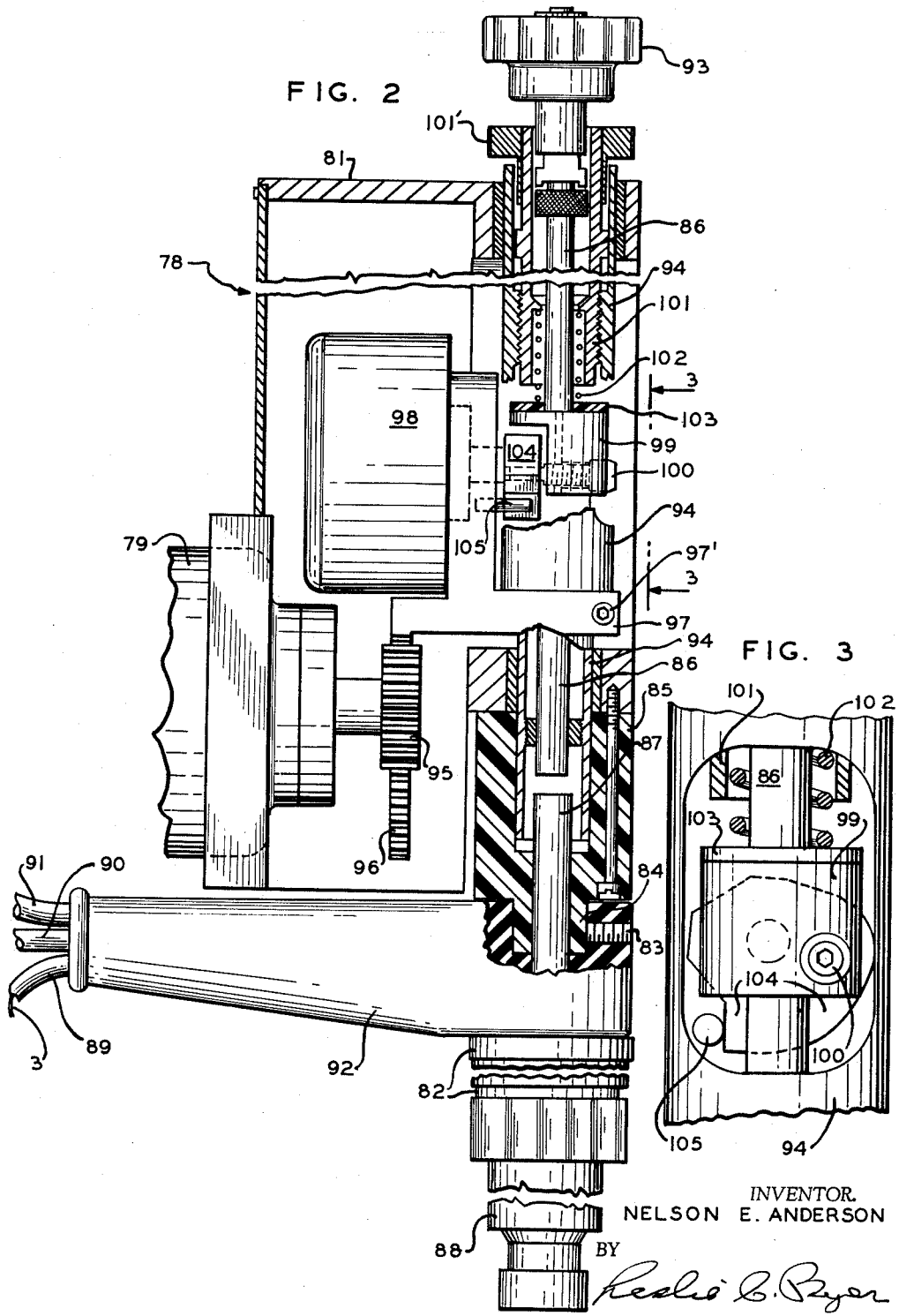
INVENTOR.
NELSON E. ANDERSON
BY
ATTORNEY

United States Patent Office 3,133,187
Patented May 12, 1964

3,133,187
TOUCH STARTING OF POWER ARCS
Nelson E. Anderson, Berkeley Heights, N.J., assignor to Air Reduction Company, Incorporated, New York, N.Y., a corporation of New York
Filed Feb. 27, 1962, Ser. No. 176,026
19 Claims. (Cl. 219—131)

My invention relates to the starting of power arcs by drawing apart two touching electrodes between which current is passing. My invention is particularly applicable to starting welding arcs such as are used in arc spot welding although it is obviously not limited thereto.

In arc spot welding a nugget of weld metal is formed between one or more parts to join them together. Where the parts are lapped upon one another the welding arc is applied to the exposed surface of the outer one of the parts and maintained until the depth of fused metal extends into an inner part covered by said outer part. Since the welding apparatus for arc spot welding is applied only to the exposed surface of one of the parts and can be made with light weight equipment, this process of welding is extensively used in place of resistance spot welding wherein massive equipment is required to supply large values of welding current betwen electrodes engaging opposite sides of an assembly of parts, an operation that in many cases cannot be performed because the assembly of parts provides no space for applying one of the resistance welding electrodes to one of the parts.

In touch arc starting of welding arcs it is desirable to keep at a low value the flow and the period of flow of short circuit current between the arcing terminals of the electrodes. Especially is this true when striking an arc between a rod like electrode and a workpiece since it limits erosion of the electrode and contamination of the electroed and the workpiece each with the metal of the other formed by their localized fusion at the contact area between them. Furthermore due to the flow of short circuit current, the electrode may become welded to the workpiece before it can be separated therefrom to draw the arc and if one of the workpieces is of thin material, the initial surge of short circuit current may melt or burn a hole in the workpiece before the arc can be struck.

The desirability of reducing the arc striking current by reducing the arc striking time has been recognized and it has been proposed to initiate the arc by separating the electrode from the workpiece by energization of an arc striking solenoid from a source of supply which is independent of the welding current source of supply in response to the operation of a voltage sensitive relay that drops out when the electrode engages the workpiece and short circuits the source of welding current. This however requires about 1/40 of a second for the relay to operate and about an equal amount of time for the solenoid to operate, during which time the short circuit current supplied by the welding machine may build up to a high value which causes excessive erosion of the electrode, welding of the electrode to the workpiece, or melting a hole in a thin workpice where it is engaged by the electrode. It is consequently desirable to reduce this arc striking time and thereby the value of short circuit current so that these undesirable results are not obtained when using touch arc starting.

Another factor to be controlled in arc spot welding is the size and shape of the weld nugget formed by the arc. This is dependent in part on the length of the arc established by the arc striking mechanism. It is consequently also desirable to provide means for obtaining constant arc lengths for each spot weld irrespective of electrode consumption, variations in work contour, tilting of the welding apparatus relative to the workpiece, or other variable factors encountered in performing the welding operation. In other words means should be provided for obtaining a predetermined arc gap between the electrode and the workpiece at the beginning of each spot welding operation in addition to means for limiting the short circuit current at the time of striking the arc.

It is an object of my invention to limit the time that electrodes are in contact with one another during a touch arc starting operation so that the short circuit current flow between said electrodes is prohibited from building up to values that are destructive to the electrodes or that cause them to weld together while they are in contact with one another.

More specifically it is an object of my invention to provide for touch arc starting of a welding arc between a rod like electrode and a workpiece under conditions which minimize erosion of the electrode and which prevent welding of the electrode to the workpiece or the production of a melt-through in a thin workpice during the arc striking operation.

It is also a specific object of my invention to provide in arc spot welding an adjustment of the electrode relative to a workpiece for constant arc length at the beginning of each operation which is terminated by deenergizing the arc and moving the electrode away from the workpiece a distance greater than the operating arc gap to allow for variations in surface contour of the same or succeeding workpiece upon which another welding operation is to be performed and to provide for feeding the electrode into contact with the workpiece for subsequent withdrawal therefrom by a predetermined distance to obtain a constant initial length of arc gap irrespective of electrode consumption during a previous welding operation.

Further objects and advantages of my invention will become apparent from the following description of one embodiment thereof.

I will describe my invention as applied to fusion spot welding with an arc established betwen a tungsten electrode and a workpiece in an inert shielding gas with current supplied from a welding machine having a drooping volt-ampere characteristic.

In accordance with the embodiment of my invention herein described the arc supporting terminal of a rod shaped tungsten electrode is fed into engagement with a workpiece by an electrode motor means and when the electrode engages the workpiece it is rapidly retracted a predetermined distance therefrom by an arc striking mechanism to form an arc supplied with current from a welding machine having a drooping volt-ampere characteristic. The arcing condition thus established is maintained for a predetermined time after which the welding circuit is interrupted to extinguish the arc. Thereafter the electrode motor means is energized for a predetermined time to withdraw the electrode to a predetermined distance from the workpiece preparatory to repeating the sequence of operations just described. Throughout each welding operation a shielding gas is supplied about the arc, the arcing terminal of the electrode, and the welding zone formed in the workpiece by the arc.

The arc striking mechanism of my invention operates in response to the discharge of a condenser through its operating winding when the electrode engages the workpiece. A circuit is provided for charging this condenser to the open circuit voltage of the welding machine while the electrode is separated from the workpiece and is being fed toward it by the electrode motor means. The arc striking mechanism has a continuous voltage rating many times less than the open circuit voltage of the welding machine, for example 15 volts relative to 75 to 100 volts for the welding machine. The high initial voltage thus applied to the operating winding of the arc striking mechanism produces a high current flow therein which causes the arc striker to accelerate its moving parts and the electrode gripping means at a high rate of speed to separate the electrode from its contact with the workpiece and strike the welding arc before the short circuit current supplied by the welding machine can obtain values destructive to the electrode or the workpiece or productive of a contact weld between the electrode and the workpiece. This high starting potential initially applied to the operating winding of the arc striking mechanism drops down exponentially to a holding voltage by the time the moving parts of the arc striking mechanism arrive at or near their limit of travel which determines the arc gap and the initial length of the arc established between the electrode and the workpiece. This prevents a destructive "homing" speed of the moving parts of the arc striking mechanism. Concurrent with the operation of the arc striking mechanism in response to the discharge of the precharged condenser, a supply circuit is provided for maintaining its operating winding energized with sufficient current to hold it in the position to which it has been operated by the condenser discharge.

With my above touch arc striking control, the short circuit contact time between an electrode and a workpiece can be reduced to two or three milliseconds in contrast to the five hundredth of a second attainable with previously proposed control arrangements. The reduction of the short circuit time obtainable with my invention minimizes electrode consumption and prevents the electrode from welding to or melting through the workpiece and at the same time renders available the benefits of prompt and positive arc starts obtainable when using touch starting for initiating the welding arc.

A detailed description of this embodiment of my invention will now be given by specific reference to its components shown in the accompanying drawings in which:

FIG. 2 is an illustration of the mechanism employed for positioning the electrode relatively to the workpiece in accordance with the operation of the electrical control shown in FIG. 1, and FIG. 3 is a detailed view of part of the arc striking mechanism shown in FIG. 2.

Figure 1:
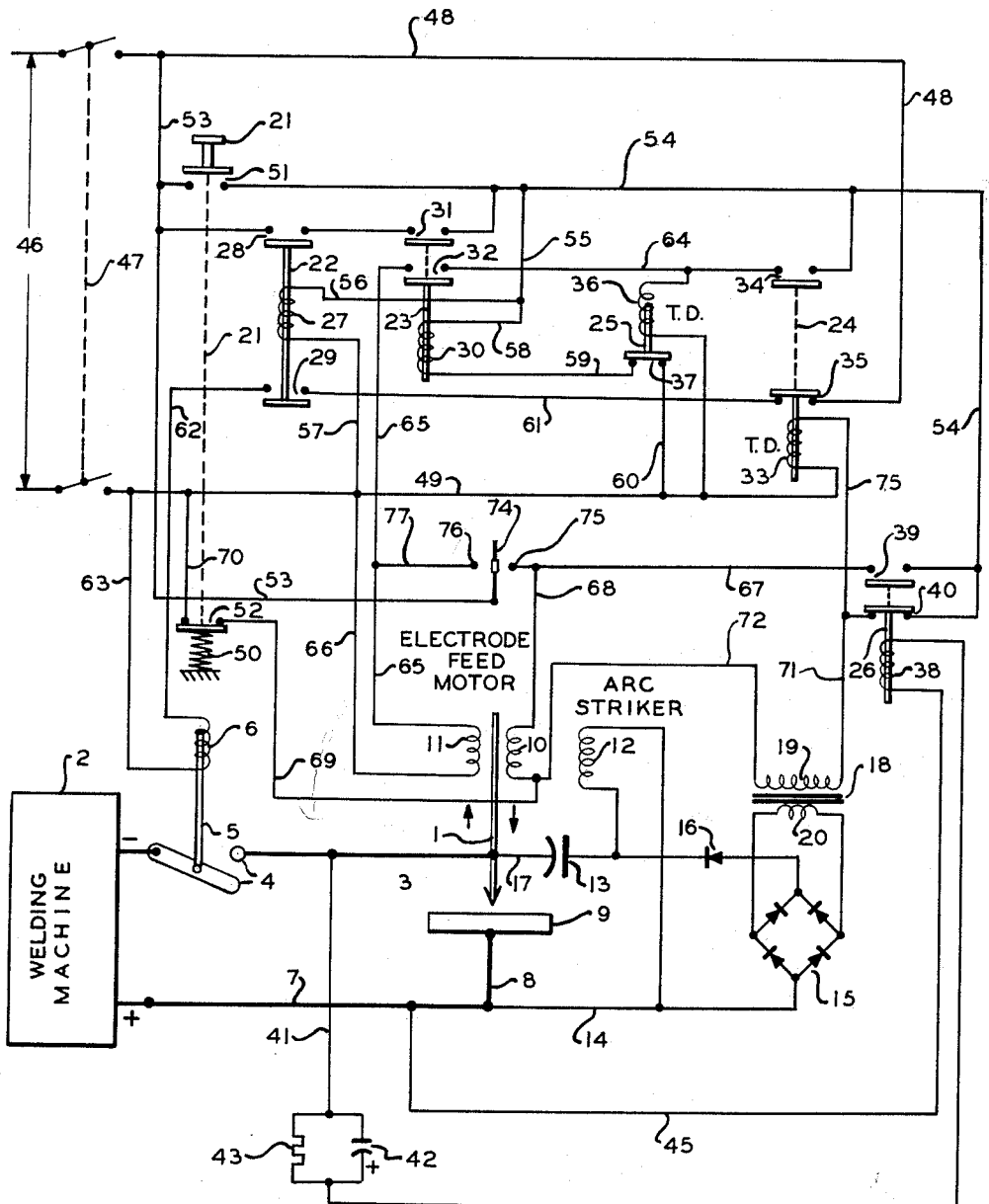
FIG. 1 is a wiring diagram showing the electrical features thereof.

In FIG. 1 the electrode 1 is electrically connected to the negative terminal of a welding machine 2 through a conductor 3 and the contacts 4 of a welding contactor 5 having an operating winding 6. The positive terminal of the welding machine 2 is connected through conductors 7 and 8 to the workpiece 9.

The electrode 1 is fed toward and away from the workpiece 9 by the selective energization of the operating windings 10 and 11 of an electrode feed motor whose output shaft is mechanically connected to a holder for the electrode. The holder for the electrode and the electrode therein may be withdrawn from the workpiece independently of the operation of the electrode feed motor by the energization of the operating winding 12 of an arc striking mechanism. The physical arrangement by which this is made possible will be described below when considering the construction of the electrode positioning mechanism shown in FIG. 2.

The operating winding 12 of the arc striking mechanism is connected in series circuit with a capacitor 13 across the electrode 1 and the workpiece 9. When the electrode is separated from the workpiece, the capacitor is charged to the open circuit voltage of the welding machine 2 through a circuit completed through conductors 7 and 14, rectifier bridge 15, blocking rectifier 16, conductors 17 and 3, and the closed contacts 4 of welding contactor 5. When the electrode engages the workpiece, the capacitor 13 will be discharged through the operating winding 12 of the arc striking mechanism to initiate its operation by which the electrode 1 is withdrawn from the workpiece 9 in order to strike a welding arc of predetermined length depending on its adjustment.

The operating winding 12 of the arc striking mechanism is energized to hold it in the position to which it has been operated by the condenser discharge by current supplied thereto through a transformer 18 having a primary winding 19 and a secondary winding 20 connected across the operating winding of the arc striking mechanism through the rectifier bridge 15 and the blocking rectifier 16.

The operation of welding contactor 5 and electrode feed motor 10, 11 as well as the energization of the primary winding 19 of transformer 18 is automatically controlled by five relays 22, 23, 24, 25 and 26, the sequence of whose operation is initiated by actuation of a push button switch 21. Relay 22 has an operating winding 27 and normally open contacts 28 and 29. Relay 23 has an operating winding 30 and normally open contacts 31 and 32. Relay 24 has an operating winding 33 and normally open contacts 34 and normally closed contacts 35. Relay 25 has an operating winding 36 and normally closed contacts 37. Relay 26 has an operating winding 38 and normally open contacts 39 and normally closed contacts 40.

The operating winding 38 of relay 26 is connected across the welding circuit conductors 3, 7 through a conductor 41, a capacitor 42 and a resistor 43 connected in parallel with one another, and conductors 44 and 45. This relay is a voltage sensitive relay and will not be operated to switch its contacts unless the voltage applied thereto is greater than the arcing voltage appearing across the electrode 1 and the workpiece 9 connected in the welding circuit. It will be operated by the open circuit voltage of the welding circuit which will occur when the welding contactor 5 has closed its contacts 4 and the electrode 1 is out of engagement with the workpiece 9. The remaining relays obtain their energization from a source of control voltage 46 which may be the readily available 110 volt alternating current. The operating windings of relays 22 to 25 inclusive receive their energization from the source of supply 46 through supply conductors 48 and 49 when disconnect switch 47 is closed. Relays 22 and 23 operate to switch their contacts as soon as their operating windings are energized. Relays 24 and 25, however, operate to switch their contacts a predetermined time after their operating windings have been energized. In the drawings this has been indicated by the letters TD associated with each of these relays.

The system shown in FIG. 1 is set into operation by depressing the push button switch 21 against the bias of its spring 50. This causes its contacts 51 to close and its contacts 52 to open. The closure of its contacts 51 completes an energizing circuit across supply conductors 48 and 49 for the operating windings 27 and 30 of relays 22 and 23. Operating winding 27 of relay 22 is energized through conductor 53, contacts 51 of switch 21 and conductors 54, 55, 56 and 57. Operating winding 30 and relay 23 is energized through conductors 53, contacts 51 of switch 21, conductors 54, 55, 58 and 59, contacts 37 of relay 25 and conductor 60. The closure of contacts 28 of relay 22 and contacts 31 of relay 23 completes a shunt holding circuit about the contacts 51 of switch 21 so that this switch may be allowed to open its contacts 51 without interrupting the operation initiated by their closure. The closure of contacts 29 of relay 22 connects the operating winding 6 of winding conductor 5 across supply conductors 48 and 49 through contacts 35 of relay 24, conductor 61, contacts 29 of relay 22, and conductors 62 and 63. The closure of contacts 32 of relay 23 prepares a circuit for energizing the field winding 11 of the electrode feed motor for operating it to retract the electrode 1 from the workpiece 9. This circuit extends from supply conductor 48 through conductor 53, contacts 28 of relay 22 and contacts 21 of relay 23, conductor 54, contacts 34 of relay 24, conductor 64, contacts 32 of relay 23 and conductors 65 and 66. The operating winding 10 of the electrode feed motor is connected across supply conductors 48 and 49 through conductor 53, contacts 28 of relay 22 and contacts 31 of relay 23, conductor 54, contacts 39 of relay 26, conductors 67, 68 and 69, contacts 52 of switch 21 and conductor 70. This will cause this motor to rotate in a direction which feeds the electrode 1 toward the workpiece 9. The primary winding 19 of transformer 18 is connected across supply conductors 48 and 49 through conductor 53, contacts 28 of relay 22 and contacts 31 of relay 23, conductor 54, contacts 40 of relay 26, conductors 71, 72 and 69, the contacts 52 of switch 21 and conductor 70.

Manual control of the electrode feed motor is provided by operation of a two-position switch 74. When this switch is operated to complete a circuit through its contact 75, winding 10 of the electrode feed motor is connected across supply conductors 48 and 49 through conductors 53, 67, 68 and 69, contacts 52 of switch 21 and conductor 70. When switch 74 is operated to complete a circuit through its contact 76 winding 11 of the electrode feed motor is connected across supply conductors 48 and 49 through conductors 53, 77, 65 and 66. Thus by operating the two-position switch 74, windings 10 and 11 of the electrode feed motor may be selectively energized to cause it to operate to feed the electrode toward or away from the workpiece 9.

The operation of the system of FIG. 1 will now be described. The welding contactor 5 and the relays 22 to 26 inclusive have been shown in the drawing in the positions they assume when deenergized.

The system is prepared for operation by having the welding machine 2 operative for supplying welding current to the welding arc to be established between the electrode 1 and the workpiece 9 and by energizing supply conductors 48 and 49 by closing switch 47 to connect them to the supply of control voltage 46. The electrode 1 is assumed to be out of engagement with the workpiece 9.

Operation of the system is initiated by depressing push button switch 21 to close its contacts 51 and to open its contacts 52. Upon closure of its contacts 51, the windings 27 and 30 of relays 22 and 23 are energized causing them to close their contacts 28, 29, 31 and 32. Winding 27 of relay 22 is connected for energization across supply conductors 48 and 49 through conductor 53, contacts 51, and conductors 54, 55, 56 and 57. Winding 30 of relay 23 is connected for energization across supply conductors 48 and 49 through conductor 53, contacts 51, conductors 54, 55, 58 and 59 contacts 37 of relay 25 and conductor 60. The closure of contacts 28 of relay 22 and contacts 31 of relay 23 establishes a shunt circuit about contacts 51 of switch 21 so that it is not necessary thereafter to hold the switch 21 in its depressed position.

The closure of contacts 29 of relay 22 completes the energizing circuit for winding 6 of welding contactor 5 across supply conductors 48 and 49 through contacts 35 of relay 24, conductor 61, contacts 29, and conductors 62 and 63. The welding contactor will consequently close its contacts 4 and connect the electrode 1 and the workpiece 9 across the terminals of the welding machine through the welding circuit conductors 3, 7 and 8.

The open circuit voltage of the welding circuit will cause relay 26 to operate since its winding 38 is connected across the open circuit between electrode 1 and workpiece 9 through conductor 41, the parallel connected capacitor 42 and resistor 43, and conductors 44 and 45. Upon closing its contacts 39, field winding 10 of the electrode feed motor is connected across the supply conductors 48 and 49 through conductors 53, contacts 28 of relay 22, contacts 31 of relay 23, conductor 54, contacts 39, conductors 67, 68 and 69, contacts 52 of switch 21 and conductor 70. The feed motor will consequently operate to feed the electrode 1 toward the workpiece 9.

Contacts 52 of switch 21 are provided to prevent false operation of the system since while welding contactor 5 is closing and before relay 26 picks up, its contacts 40 would be closed and the primary 19 of transformer 18 would be connected across the supply conductors 48 and 49 if it were not for the opening in its supply circuit at contacts 52. The delay in depressing and thereafter releasing push button switch 21 provides time for welding contactor 5 and relay 26 to operate so that when contacts 52 of the push button switch are closed contacts 40 of relay 26 are open in the energizing circuit of primary winding 19 which extends from supply conductor 48 through conductor 53, contacts 28 of relay 22, contacts 31 of relay 23, conductor 54, contacts 40, conductors 71, 72 and 69, contacts 52, and conductor 70 to the other supply conductors 49.

While the electrode 1 is being fed to the work by its feed motor, charging current is being supplied from the welding machine 2 to the condenser 13 through conductors 7 and 14, rectifier bridge 15, blocking rectifier 16, conductors 17 and 3 and contacts 4 of the welding contactor 5. A small amount of this charging current will flow through winding 12 of the arc striking mechanism since this winding is in shunt to the unidirectional circuit through rectifiers 15 and 16. Since the forward voltage drop across these rectifiers is of the order of one or two volts, the impedance of winding 12 will prevent the passage of an operating value of current flow through the winding.

When the electrode 1 engages the workpiece 9 the capacitor 13 discharges through operating winding 12 of the arc striking mechanism through a circuit completed from one terminal of the capacitor through winding 12, conductors 14 and 8, workpiece 9, electrode 1 and conductor 17 to the other terminal of the capacitor. Discharge current flow in shunt to winding 12 is prevented by rectifiers 15 and 16. An arc is consequently drawn between the electrode 1 and the workpiece 9.

When a shunt circuit is established between the electrode 1 and the workpiece 9, relay 26 drops out opening its contacts 39 to deenergize the electrode feed motor and closing its contacts 40 to energize the primary winding 19 of transformer 18 through a circuit traced above. This transformer through its secondary 20 and rectifiers 15 and 16 supplies sufficient current to winding 12 of the arc striking mechanism to hold it in its operated position. The presence of capacitor 42 in circuit with the winding 38 of relay 26 accelerates the rapidity of the drop-out of this relay by providing a voltage which opposes the voltage induced in its winding by the collapse of its field when the electrode 1 engages the workpiece 9 and provides a short circuit for this winding.

The closure of contacts 40 of relay 26 also connects winding 33 of time delay relay 24 across supply conductors 48 and 49 through conductor 53, contacts 28 of relay 21, contacts 31 of relay 23 and conductors 54 and 71. This relay times the interval during which welding current flows through the welding arc. At the end of its time delay period it operates to open its contacts 35 and close its contacts 34. The opening of its contacts 35 deenergizes the operating winding 6 of welding contactor 5 which consequently opens its contacts 4 in the welding circuit to interrupt current flow to the welding arc between the electrode 1 and the workpiece 9.

The closure of contacts 34 of relay 24 completes the energizing circuit for winding 11 of the electrode feed motor to operate it to feed electrode 1 away from the workpiece 9. This circuit extends from supply conductor 48 through conductor 53, contacts 28 of relay 22, contacts 31 of relay 23, conductor 54, contacts 34, conductor 64, contacts 32 of relay 23 and conductors 65 and 66. It also completes the energizing circuit for winding 36 of time delay relay 25 from supply conductor 48 through conductor 53, contacts 28 of relay 22, contacts 31 of relay 23, conductors 54 and 64 to supply conductor 49. After a predetermined time delay relay 25 opens its contacts to deenergize the operating winding 30 of relay 23. This deenergizes field winding 11 of the electrode feed motor and thus determines the distance the electrode 1 is fed away from the workpiece 9 after a welding operation. Relay 23 also opens its contacts 31 when its winding 30 is deenergized thus returning the system to the condition in which it was before switch 21 was operated to close its contacts 51.

It will thus been seen that I have provided arc welding apparatus comprising means for completing the connection of the respective terminals of a source of welding current to an electrode and a workpiece, a motor means for feeding said electrode toward and away from said workpiece, a voltage sensitive means connected across said electrode and said workpiece and operate from one position to another in response to voltages greater than arcing voltages between said electrode and said workpiece, and means responsive to the operation of said voltage sensitive means to its said other position for energizing said electrode motor means to feed said electrode into engagement with said workpiece. I have also provided a capacitor, arc striking means for withdrawing said electrode from engagement with said workpiece, said means having an operatnig winding connected in series with said capacitor across said electrode and said workpiece and energized by the discharge current of said capacitor when said electrode engages said workpiece, and means for charging said capacitor to the open circuit voltage of said source of welding current when said electrode is out of engagement with said workpiece, said means including a unidirectional current conducting circuit connected across said operating winding of said arc striking means and having an impedance relative thereto low enough to limit capacitor charging current flow through said operating winding at the open circuit voltage of said source of welding current to a value that will not operate said arc striking means. I have further provided means responsive to the operation of said voltage sensitive means to its said one position for supplying to said operating winding of said arc striking means sufficient current to hold it in the position to which it has been operated by the discharge of current from a said capacitor, and also for energizing a time delay means, and for deenergizing said electrode feed motor means. I have also provided means responsive to the operation of said time delay means for interrupting the connection of said source of welding current to said electrode and said workpiece, for energizing a second time delay means, and for energizing said motor means to feed said electrode away from said workpiece, and means responsive to the operation of said second time delay means for deenergizing said electrode feed motor means.

The electrode positioning mechanism 78 shown in FIGS. 2 and 3 of the drawings embodies the electrode feed motor 79 diagrammatically shown in FIG. 1 by its operating windings 10 and 11 and the arc striking solenoid 98 diagrammatically shown in FIG. 1 by its operating winding 12. These members are supported in a casing 81 on which a gas-arc welding torch 82 is mounted by being clamped by a set screw 83 to a projecting end portion of reduced diameter 84 forming part of an insulating collar 85 which is attached to the casing 81 in alignment with the electrode holder 86 forming part of the electrode positioning mechanism. The welding torch has been shown with parts broken away to provide space for an enlarged view of the electrode positioning mechanism 78 in which the parts have been shown near the end of the range of travel for an electrode adjustment so as to provide a compact arrangement of parts in the drawing.

The gas-arc welding torch 82 has a guide tube 87 for the welding electrode and a nozzle portion 88 within which the arc supporting terminal portion of the electrode is located. The guide tube is provided with a contact mechanism which slidably engages the electrode and supplies welding current thereto from a conductor 3 which is enclosed in a cooling water exhaust tube 89. Cooling water is supplied to the torch through a flexible tube 90 and gas is supplied to nozzle 88 through a flexible tube 91. The connections of these tubes and the welding conductor with the component parts of the gas-arc torch is enclosed in a boot 92 which extends laterally from the torch. The component parts of the torch have not been illustrated and described in detail for their arrangement in such gas-arc torches is well known. Furthermore the particular structure of the torch except as noted above forms no part of my invention.

The welding electrode is held within a tube 86 by being clamped therein on the outer end of this tube by a collet which is brought into engagement with the electrode by turning a knob 93 which makes a threaded engagement with this end of the tube which will be referred to hereafter as an electrode holder.

The electrode holder 86 is slidably movable lengthwise of a carrier tube 94 which is supported for lengthwise movement in casing 81 toward and away from the welding torch also mounted on this casing. Lengthwise movement is imparted to this carrier tube by the electrode feed motor 79 which has a spur gear 95 on its shaft which engages a rack 96 forming one arm of a bracket the other arm 97 of which is clamped to the carrier tube by clamping screw 97'. This bracket also provides a support for the arc striking solenoid 98.

The carrier tube is enlarged beyond the location where bracket arm 97 is clamped thereto to provide a cavity for a clamp 99 which is closed in driving engagement with the electrode holder tube by a screw 100 and for an adjustable stop 101 making a threaded engagement with its internal end portion. This stop is provided with a knob 101', has a barrel portion which extends beyond the end of the carrier tube, and has micrometer graduations thereon which can be brought into register with an index mark on the outer end surface of the carrier tube. The inner end of this stop has a cavity within which there is a spring 102 the ends of which engage the inner end of this cavity and the adjacent surface of an insulating washer 103 which rests against the adjacent end of clamp 99 and biases the electrode holding tube away from the stop 101. The adjustable separation of the inner end of the stop 101 and the outer surface of washer 103 determines the distance that the electrode holding tube is moved lengthwise of its carrier tube by operation of the solenoid of the arc striking mechanism and thus determines the length of the arc gap between the arc supporting terminal of the welding electrode and the work-piece from which it is separated by operation of the arc striking mechanism.

This arc striking movement is imparted to the electrode holding tube 86 by a crank member 104 which is attached to the shaft of the solenoid and to the inner end of the clamp holding screw 100 which is offset from the center line of the electrode holding tube. Spring 102 between stop 101 and clamp 99 biases a shoulder portion of this crank member against a stop pin 105 and thus determines the initial position of the electrode holder tube in carrier tube 94 from which it is moved by operation of the solenoid of the arc striking mechanism.

It will thus be seen that when the casing 81 of the electrode positioning mechanism 78 is supported in fixed location relative to a workpiece, energization of winding 10 of the feed motor 79 will feed the carrier tube and the electrode holding tube 86 therein toward the workpiece to bring the arc supporting terminal of the electrode in the electrode holding tube into engagement with the workpiece. Energization of the operating winding 12 of the rotary solenoid 98 will then rotate crank member 104 to raise the electrode holding tube 86 against the bias of spring 102 and thereby the electrode from the workpiece by a distance determined by the adjustment of stop 101 in the outer end of the carrier tube. After striking the welding arc, holding current supplied to the winding of the arc striking solenoid will hold the arc striking mechanism in the position to which it has been operated in striking the welding arc. Thereafter energization, after a predetermined welding time, of winding 11 of feed motor 79 will retract the electrode holding tube and the arc supporting terminal of the electrode therein a predetermined distance from the workpiece depending on the time interval of such energization.

Periodically, depending on its consumption, the electrode is adjusted toward the workpiece in its holding tube 86 by releasing and reclamping its holding collet by operation of knob 93. Prior to making this adjustment, feed motor 79 is operated manually to move the carrier tube 94 away from the workpiece by an amount within the length of rack 96 of the bracket 96 to accommodate this adjustment of the projection of the electrode from its holding tube 86 and into guide tube 87 of the welding torch 82.

Obviously the feed motor 79 and the operating solenoid 98 for the arc striking mechanism may be varied according to the availability of suitable items for accomplishing the functions above attributed to those illustrated and described. The arc striking solenoid may have a rectilinear motion if the remaining parts of the arc striking mechanism are suitably modified to accommodate this substitution. The inertia of the moving parts of the arc striking mechanism should be comparatively low in order to insure its rapid response when energized to strike the welding arc.

In my arc striking mechanism I have used a rotary solenoid of the construction shown in United States Letters Patent 2,496,880 George H. Leland February 7, 1950. I have also found it advantageous to use a feed motor in which a stepped rotation of its armature avoids any coasting or overtravel when it is deenergized after a period of energization. Motors of this type are exemplified by the disclosure in United States Letters Patent 2,834,896 Charles P. Fisher May 13, 1958 although of course the construction particularly shown and described therein need not be used. In fact under certain circumstances a conventional feed motor may be used.

In applying my invention I also contemplate adding thereto various refinements known to those skilled in the art of arc welding. For example near the end of a normal weld cycle, the electrode could be withdrawn an adjustable amount. This would lower the welding current due to the drooping characteristics of the welding machine and cause the arc to spread out to stress relieve the edge of the weld as well as to smooth out any undercut at the weld and to minimize cracking in the arc crater position of the weld. A further refinement would be to add a controlled current down-slope to this portion of the cycle.

It is of course obvious to those skilled in the art that my invention is not limited to the use of nonconsuming electrodes supplied with welding current from a welding machine having a drooping volt-ampere characteristic as above described. Consumable electrodes supplied with current from constant potential or rising volt-ampere characteristic welding machines may be used. When using a consumable electrode, it is of course obvious that the feed motor will be operated to feed the electrode in accordance with its consumption in the arc after the arc striking mechanism has been operated to initiate this arc. Furthermore the rate of electrode feed may be constant but adjustable when using high current densities which are productive of a self-regulating arc or, under other conditions, it may be variable in accordance with the voltage across the arc. Both of these arrangements are well kown in the arc welding art.

The capacitance of the arc striking capacitor may be varied and the voltage to which it is charged relative to the rated operating voltage of the arc striking solenoid may also be varied in order to establish desired operating conditions. For example a source of voltage may be included in the charging circuit of the capacitor to increase the welding machine voltage applied thereto. This could be done by adding this voltage source in the circuit of conductor 14 of FIG. 1 of the drawings.

Furthermore, my invention is not limited in its application to arc spot welding operations but is generally applicable to other forms of arc welding and for striking power arcs used for other purposes.

In view of the above description of one embodiment of my invention, various other modifications and applications thereof will be apparent to those skilled in the art. I therefore intend to cover by the appended claims all such modifications and applications of my invention as fall within the true spirit and scope thereof.

I claim:

1. Means for striking an arc between the arc supporting terminals of cooperating electrodes, said means comprising a capacitor, arc striking means for separating the arc supporting terminals of said electrodes a predetermined distance from one another after they have been brought into engagement with one another from a position in which they were out of engagement with one another, said means having an operating winding connected in series with said capacitor across said electrodes and energized by the discharge current of said capacitor when said electrodes engage one another, and means for charging said capacitor when said electrodes are out of engagement with one another.

2. Means for striking an arc between the arc supporting terminals of cooperating electrodes, said means comprising a capacitor, arc striking means for separating the arc supporting terminals of said electrodes a predetermined distance from one another after they have been brought into engagement with one another from a position in which they were out of engagement with one another, said means having an operating winding connected in series with said capacitor across said electrodes and energized by the discharge current of said capacitor when said electrodes engage one another, means for charging said capacitor when said electrodes are out of engagement with one another, and means for maintaining said arc striking means in the position to which it has been operated by the discharge current of said capacitor.

3. Means for striking an arc between the arc supporting terminals of cooperating electrodes, said means comprising a capacitor, arc striking means for separating the arc supporting terminals of said electrodes a predetermined distance from one another after they have been brought into engagement with one another from a position in which they were out of engagement with one another, said means having an operating winding connected in series with said capacitor across said electrodes and energized by the discharge current of said capacitor when said electrodes engage one another, and means effective when said electrodes are out of engagement with one another for charging said capacitor to a voltage which will produce when said electrodes engage one another a rapid build up of current flow through said operating winding of said arc striking means which may be in excess of that required to actuate said arc striking means.

4. Means for striking an arc between the arc supporting terminals of cooperating electrodes, said means comprising a capacitor, arc striking means for separating the arc supporting terminals of said electrodes a predetermined distance from one another after they have been brought into engagement with one another from a position in which they were out of engagement with one another, said means having an operating winding connected in series with said capacitor across said electrodes and energized by the discharge current of said capacitor when said electrodes engage one another, means effective when said electrodes are out of engagement with one another for charging said capacitor to a voltage which will produce when said electrodes engage one another a rapid build up of current flow through said operating winding of said arc striking means which may be in excess of that required to actuate said arc striking means, and means for maintaining said arc striking means in the position to which it has been operated by the discharge current of said capacitor.

5. Means for striking an arc between the arc supporting terminals of cooperating electrodes when they are connected in circuit with a source of arc welding current, said means comprising a capacitor, arc striking means for separating the arc supporting terminals of said electrodes a predetermined distance from one another after they have been brought into engagement with one another from a relative position in which they were out of engagement with one another, said means having an operating winding connected in series with said capacitor across said electrodes and energized by the discharge current of said capacitor when said electrodes engage one another, and means operative when said electrodes are out of engagement with one another for charging said capacitor to the voltage of said source of welding current connected in circuit therewith, said means including a unidirectional current conducting circuit connected across said operating winding of said arc striking means and having an impedance relative thereto low enough to limit capacitor charging current flow through said operating winding to a value that will not operate said arc striking means.

6. Means for striking a welding arc between an electrode and a workpiece when they are connected in circuit with a source of arc welding current and initially separated from one another, said means comprising a capacitor, arc striking means for withdrawing said electrode a predetermined distance from said workpiece after it has been brought into engagement therewith, said means having an operating winding connected in series with said capacitor across said electrode and said workpiece and energized by the discharge current of said capacitor when said electrode engages said workpiece, and means operative when said electrode is out of engagement with said workpiece for charging said capacitor to the voltage of said source of welding current, said means including a unidirectional current conducting circuit connected across said operating winding of said arc striking means and having an impedance relative thereto low enough to limit the capacitor charging current flow through said operating winding to a value that will not operate said arc striking means.

7. Means for striking a welding arc between an electrode and a workpiece when they are connected in circuit with a source of arc welding current and initially separated from one another, said means comprising a capacitor, arc striking means for withdrawing said electrode a predetermined distance from said workpiece after it has been brought into engagement therewith, said means having an operating winding connected in series with said capacitor across said electrode and said workpiece and energized by the discharge current of said capacitor when said electrode engages said workpiece, means operative when said electrode is out of engagement with said workpiece for charging said capacitor to the voltage of said source of welding current connected in circuit therewith, said means including a unidirectional current conducting circuit connected across said operating winding of said arc striking means and having an impedance relative thereto low enough to limit capacitor charging current flow through said operating winding to a value that will not operate said arc striking means, and means responsive to voltages across said electrode and said workpiece which are not greater than arc voltages for supplying to said operating winding of said arc striking means sufficient current to hold it in the position to which it has been operated by the discharge of current from said capacitor.

8. Apparatus comprising circuit means for applying across an electrode and a workpiece the voltage and current of a source of arc welding current, an arc striker having an operating winding for mechanism connected with said electrode to move it away from said workpiece upon energization of its said operating winding with its rated operating voltage which is substantially less than the open circuit voltage of said source of arc welding current, a capacitor, means for charging said capacitor to the open circuit voltage of said source of arc welding current when said electrode is out of engagement with said workpiece and for discharging said capacitor through said operating winding of said arc striker when said electrode engages said workpiece, said means comprising circuits connected in parallel with one another across said electrode and said workpiece, one of said circuits being said operating winding of said arc striker and the other being a circuit containing a blocking rectifier poled to pass charging current to said capacitor in one direction only about said operating winding of said arc striker and to force discharge current from said capacitor through said operating winding of said arc striker, said rectifier circuit having an impedance to the flow of current therethrough at the open circuit voltage of said source of arc welding current which limits the flow of capacitor charging current through said operating winding of said arc striker to a value which is insufficient to actuate said arc striker.

9. Apparatus comprising circuit means for applying across a non-consuming electrode and a workpiece the voltage and current of a source of arc welding current having a drooping volt-ampere characteristic, an arc striker having an operating winding for mechanism connected with said electrode for moving it away from said workpiece upon energization of its said operating winding with a voltage substantially less than the open circuit voltage of said source of arc welding current, a capacitor connected across said electrode and said workpiece through circuits connected in parallel with one another, one of said circuits being said operating winding of said arc striker and the other being a circuit containing a blocking rectifier poled to pass charging current flow to said capacitor from said source of arc welding current in one direction only about said operating winding of said arc striker and to force discharge current from said capacitor through said operating winding of said arc striker when said electrode engages said workpart, said rectifier circuit having an impedance to the flow of current therethrough at the open circuit voltage of said source of arc welding current which limits capacitor charging current flow through said operating winding of said arc striker to a value which is insufficient to actuate said arc striker.

10. Apparatus comprising means for applying across a non-consuming electrode and a workpiece the voltage and current of a source of arc welding current having a drooping volt-ampere characteristic, an arc striker having an operating winding for mechanism connected with said electrode for moving it away from said workpiece upon energization of its said operating winding with its rated operating voltage which is substantially less than the open circuit voltage of said source of arc welding current, and a capacitor connected across said electrode and said workpiece through circuits connected in parallel with one another, one of said circuits being said operating winding of said arc striker and the other being a circuit containing a blocking rectifier poled to pass charging current flow to said capacitor from said source of arc welding current in one direction only about said operating winding of said arc striker to charge it to the voltage of said source of arc welding current when said electrode is out of engagement with said workpiece and said source of arc welding current is connected across said electrode and said workpiece and to force discharge current from said capacitor through said operating winding of said arc striker when said electrode engages said workpart, said rectifier circuit having an impedance to the flow therethrough of capacitor charging current at the open circuit voltage of said source of arc welding current which limits capacitor charging current flow through said operating winding of said arc striker to a value that will not operate said arc striker.

11. Arc welding apparatus comprising means for completing the connection of the respective terminals of a source of welding current with an electrode and a workpiece, motor means for feeding said electrode toward said workpiece, a voltage sensitive means connected across said electrode and said workpiece and operated from one position to another in response to voltages greater than arcing voltages between said electrode and said workpiece, means responsive to the operation of said voltage sensitive means to its said other position for energizing said motor means to feed said electrode into engagement with said workpiece, a capacitor, arc striking means for withdrawing said electrode from engagement with said workpiece, said means having an operating winding connected in series with said capacitor across said electrode and said workpiece and energized by the discharge current of said capacitor when said electrode engages said workpiece, means for charging said capacitor to the open circuit voltage of said source of welding current when said electrode is out of engagement with said workpiece, said means including a unidirectional current conducting circuit connected across said operating winding of said arc striking means and having an impedance relative thereto low enough to limit capacitor charging current flow through said operating winding at the open circuit voltage of said source of welding current to a value that will not operate said arc striking means, and means responsive to the operation of said voltage sensing means to its said one position for de-energizing said motor means and for supplying to said operating winding of said arc striking means sufficient current to hold it in the position to which it has been operated by the discharge current from a said capacitor.

12. Arc welding apparatus comprising means for completing the connection of the respective terminals of a source of welding current to an electrode and a workpiece, motor means for feeding said electrode toward and away from said workpiece, a voltage sensitive means connected across said electrode and said workpiece and operated from one position to another in response to voltages greater than arcing voltages between said electrode and said workpiece, means responsive to the operation of said voltage sensitive means to its said other position for energizing said motor means to feed said electrode into engagement with said workpiece, a capacitor, arc striking means for withdrawing said electrode from engagement with said workpiece, said means having an operating winding connected in series with said capacitor across said electrode and said workpiece and energized by the discharge current of said capacitor when said electrode engages said workpiece, means for charging said capacitor to the open circuit voltage of said source of welding current when said electrode is out of engagement with said workpiece, said means including a unidirectional current conducting circuit connected across said operating winding of said arc striking means and having an impedance relative thereto low enough to limit capacitor charging current flow through said operating winding at the open circuit voltage of said source of welding current to a value that will not operate said arc striking means, means responsive to the operation of said voltage sensitive means to its said one position for supplying to said operating winding of said arc striking means sufficient current to hold it in the position to which it has been operated by the discharge of current from a said capacitor, and also for energizing a time delay means, and for deenergizing said motor means, means responsive to the operation of said time delay means for interrupting the connection of said source of welding current to said electrode and said workpiece, for energizing a second time delay means, and for energizing said motor means to feed said electrode away from said workpiece, and means responsive to the operation of said second time delay means for deenergizing said electrode motor means.

13. Arc welding apparatus comprising means for completing the connection of the respective terminals of a source of welding current having a drooping volt-ampere characteristic to an electrode and a workpiece, motor means for feeding said electrode toward and away from said workpiece, a voltage sensitive means connected across said electrode and said workpiece and operated from one position to another in response to voltages greater than the arcing voltage between said electrode and said workpiece, means responsive to the operation of said voltage sensitive means to its said other position for energizing said motor means to feed said electrode into engagement with said workpiece, a capacitor, arc striking means for withdrawing said electrode from engagement with said workpiece, said means having a winding which has a rated operating voltage which is substantially less than the open circuit voltage of said source of welding current and which is connected in series circuit with said capacitor for operating said means in response to the discharge current of said capacitor when said electrode engages said workpiece, means for charging said capacitor to the open circuit voltage of said source of welding current when said electrode is out of engagement with said workpiece, said means including a unidirectional current conducting circuit connected across said operating winding of said arc striking means and having an impedance relative thereto low enough to limit capacitor charging current flow through said operating winding at the open circuit voltage of said source of welding current to a value that will not operate said arc striking means, means responsive to the operation of said voltage sensing means to its said one position for supplying to said operating winding of said arc striking means sufficient current to hold it in the position to which it has been operated by the discharge of current from a said capacitor, and also for energizing a time delay means, and for deenergizing said motor means, means responsive to the operation of said time delay means for interrupting the connection of said source of welding current to said electrode and said workpiece, for energizing a second time delay means, and for energizing said motor means to feed said electrode away from said workpiece, and means responsive to the operation of said second time delay means for deenergizing said motor means.

14. Arc welding apparatus comprising means for completing the connection of the respective terminals of a source of arc sustaining current to a pair of cooperating electrodes, motor means for feeding the arcing terminals of said electrode toward and away from one another, means responsive to open circuit conditions between said electrodes for operating said motor means to feed the arcing terminals thereof toward and into engagement with one another, an electrical arc striking means for separating said electrodes from engagement with one another by a predetermined distance, said means having a winding by whose energization it is operated, means responsive to the engagement of the arc supporting terminals of said electrodes for operating said arc striking means, means for interrupting the flow of arcing current between said electrodes after a predetermined time interval initiated concurrently with the operation of said arc striking means, and means effective after said predetermined time interval for operating said motor means to feed said electrodes away from one another for a second predetermined time interval after which said motor is deenergized.

15. Arc welding apparatus comprising means for completing the connection of the respective terminals of a source of arc sustaining current to a pair of cooperating electrodes, motor means for feeding the arcing terminals of said electrode toward and away from one another, means responsive to open circuit conditions between said electrodes for operating said motor means to feed the arcing terminals thereof toward and into engagement with one another, an electrical arc striking means for separating said electrodes from engagement with one another by a predetermined distance, said means having a winding by whose energization it is operated, means for controlling the time during which arc current flows from said source and between the arcing terminals of said electrodes, means responsive to the engagement of the arc supporting terminals of said electrodes for actuating said arc striking means by energizing its said operating winding and for initiating operation of said arc current time control means, means for controlling the time during which said motor means feeds said electrodes away from one another, and means for initiating operation of said last mentioned means immediately after said arc current time control means has interrupted the flow of arc current between said electrodes.

16. Electric arc apparatus comprising a source of arc current in circuit with an electrode and a workpiece, means for advancing said electrode into contact with said workpiece to initiate a flow of current in said circuit, a capacitor, means for charging said capacitor, solenoid operated means which when actuated withdraws said electrode a predetermined distance from said workpiece to thereby establish an arc, and means for causing said capacitor to discharge through the winding of said solenoid immediately upon contact of said electrode and said workpiece to thereby actuate said solenoid operated means and establish said arc.

17. Electric arc apparatus according to claim 16 in which the capacitor discharge circuit includes said electrode and said workpiece.

18. In electric arc welding apparatus of the type in which the arc is struck by impressing an arc starting and sustaining potential from a source of arc current between an electrode and a workpiece, advancing said electrode into contact with said workpiece and withdrawing said electrode a predetermined distance from said workpiece after momentary contact therewith by the action of a solenoid operated mechanism, the improvement which comprises a capacitor, means for charging said capacitor while said electrode and workpiece are out of contact, and circuit means for discharging said capacitor through the actuating winding of the solenoid upon contact of said electrode and said workpiece.

19. The method of striking an arc which comprises impressing an arc starting and sustaining potential from a source of arc current of given polarity between a pair of electrodes having arc supporting terminals which are initially separated from one another, charging a capacitor connected across said electrodes with a charge electrically poled the same way with respect to the electrodes as the source of arc current, relatively advancing the arc supporting terminals of said electrodes into contact with one another to cause current from said source of arc current and from said capacitor to flow between said electrodes and utilizing the flow of current produced by the discharge of said capacitor to actuate a solenoid to withdraw the electrodes a predetermined distance from one another to thereby establish an arc gap and an arc therebetween.

References Cited in the file of this patent
UNITED STATES PATENTS 1,392,436    Morton _____ Oct. 4, 1921